US012466694B2

(12) United States Patent
Kalliomaki et al.

(10) Patent No.: US 12,466,694 B2
(45) Date of Patent: Nov. 11, 2025

(54) METHOD FOR OPERATING AN ELEVATOR

(71) Applicant: Kone Corporation, Helsinki (FI)

(72) Inventors: Jaakko Kalliomaki, Helsinki (FI); Jarkko Saloranta, Helsinki (FI); Mikko Puranen, Helsinki (FI); Sakari Mantyla, Helsinki (FI); Joonas Sorvari, Helsinki (FI)

(73) Assignee: Kone Corporation, Helsinki (FI)

( * ) Notice: Subject to any disclaimer, the term of this patent is extended or adjusted under 35 U.S.C. 154(b) by 1353 days.

(21) Appl. No.: 17/138,343

(22) Filed: Dec. 30, 2020

(65) Prior Publication Data

US 2021/0206597 A1 Jul. 8, 2021

(30) Foreign Application Priority Data

Jan. 7, 2020 (EP) .................................... 20150524

(51) Int. Cl.
*B66B 1/34* (2006.01)
*B66B 1/28* (2006.01)

(Continued)

(52) U.S. Cl.
CPC .............. *B66B 1/28* (2013.01); *B66B 1/3407* (2013.01); *B66B 1/3461* (2013.01);
(Continued)

(58) Field of Classification Search
CPC ....... B66B 1/28; B66B 1/3407; B66B 1/3461; B66B 1/3492
(Continued)

(56) References Cited

U.S. PATENT DOCUMENTS

2009/0114484 A1 5/2009 Watanabe et al.
2011/0172932 A1* 7/2011 Bachmann ............ B66B 7/1238 702/34

(Continued)

FOREIGN PATENT DOCUMENTS

EP 2733103 B1 1/2016
JP 2008-133105 A 6/2008

(Continued)

OTHER PUBLICATIONS

European Search Report for European Application No. 20150524.5 dated Jul. 21, 2020.

(Continued)

*Primary Examiner* — Erick D Glass
(74) *Attorney, Agent, or Firm* — Harness, Dickey & Pierce, P.L.C.

(57) ABSTRACT

The invention relates to a method for operating an elevator installed in connection with a building, particularly a high rise elevator, in which method the expected rope sway is monitored using building acceleration data obtained by means of a sensor to calculate a building sway, and whereby based on the building sway and the position of an elevator car a rope sway is estimated, which rope sway is compared with a threshold value to determine excessive rope sway and to deduct operation measures for the elevator in order to counteract a determined excessive rope sway. According to the invention a succession of following steps is performed:

determining a movement profile for the elevator car by means of an elevator controller predicting the elevator car position based on the movement profile calculating the estimated rope sway based on the predicted car position and the building acceleration data.

This leads to an early detection of a possible excessive rope sway happening in the future in course of servicing elevator calls by the allocated elevator car.

15 Claims, 3 Drawing Sheets

(51) Int. Cl.
*B66B 5/02* (2006.01)
*B66B 7/06* (2006.01)
*B66B 7/12* (2006.01)

(52) U.S. Cl.
CPC .............. *B66B 1/3492* (2013.01); *B66B 5/02* (2013.01); *B66B 7/06* (2013.01); *B66B 7/1215* (2013.01)

(58) Field of Classification Search
USPC ........................................................... 187/247
See application file for complete search history.

(56) References Cited

U.S. PATENT DOCUMENTS

2013/0173206 A1* 7/2013 Benosman ................ B66B 7/06 702/141
2015/0008075 A1* 1/2015 Benosman ................ B66B 7/06 187/247
2018/0265327 A1* 9/2018 Benosman ................ B66B 7/06
2019/0177126 A1* 6/2019 Murata ................... B66B 7/068
2022/0112052 A1 4/2022 Nakazawa et al.
2023/0234810 A1* 7/2023 Roberts ..................... B66B 1/28 187/247

FOREIGN PATENT DOCUMENTS

JP 2011-051739 A 3/2011
JP 6494793 B2 4/2019
JP 2019-112234 A 7/2019

OTHER PUBLICATIONS

Japanese Office Action dated Oct. 30, 2024 issued in corresponding Japanese Patent Appln. No. 2021-001508 (English translation).

* cited by examiner

METHOD FOR OPERATING AN ELEVATOR

RELATED APPLICATIONS

This application claims priority to European Patent Application No. 20150524.5 filed on Jan. 7, 2020, the entire contents of which are incorporated herein by reference.

TECHNICAL FIELD

The present invention relates to a method for operating an elevator installed in connection with a building, particularly a high rise elevator. These elevators, especially in high buildings such as skyscrapers, may be exposed to building sway, caused by strong wind or seismic waves. Building sway may invoke rope sway. A rope sway may be excessive, especially if the natural frequency of the rope matches the frequency of the building sway. An excessive rope sway is dangerous, as it may cause ropes hitting the hoistway devices.

BACKGROUND

On this behalf elevators are equipped with at least one building sway sensor, such as an acceleration sensor. When a given amount of building sway is measured the elevator operation is interrupted. By this way any dangerous situation of excessive rope sway may be prevented. However, the elevator operation may be interrupted also in potentially harmless situations, causing unnecessary interruptions to elevator service.

The Publication EP 2 733 103 B1 discloses a solution wherein rope sway is estimated by means of pre-calculated tables, based on the current position of a running elevator car and the building acceleration (shake). The elevator operation is interrupted only if the estimated rope sway exceeds a given threshold value. With this solution the elevator operation has to be interrupted only in selected situations, on the basis of the estimation result, which improves elevator service.

SUMMARY

It is object of the present invention to provide a method which is able to counteract excessive rope sway in an earlier stage and to improve elevator ride comfort in rope sway situation.

The object is solved with a method according to claim 1 and with an elevator according to claim 13. Preferred embodiments of the invention are subject-matter of the corresponding dependent claims. Preferred embodiments are also described in the specification of the application.

In the inventive method for operating an elevator installed in connection with a building, particularly a high rise elevator, the expected rope sway is monitored using building acceleration data obtained by means of at least one sensor to calculate or predict a building sway. Based on the building sway and the position of an elevator car a rope sway is estimated. The estimated rope sway is compared with at least one threshold value to determine excessive rope sway and to deduct operation measures for the elevator in order to counteract a determined excessive rope sway.

According to the invention, a movement profile for the elevator car is established by means of an elevator controller. Based on this movement profile, the car position of the elevator car is predicted. The estimated rope sway is now calculated based on the predicted car position and the building acceleration data and not on the current car position as in the known solution of EP 2 733 103 B1. The advantage of the inventive solution is that it is possible to calculate excessive rope sway already before the elevator car has assumed the position which is predicted as the position of the excessive rope sway. This again allows to take countermeasures before the elevator car reaches the critical position which is correlated with the excessive rope sway. This way it may be possible to improve elevator ride comfort in rope sway situation and/or improve elevator safety.

In a preferred embodiment of the invention, a virtual model of the elevator is used to calculate the rope sway based on the measured building acceleration and the predicted elevator car position. The virtual model of the elevator comprises the critical parameters of the elevator such as the car path, counterweight path, rope length and position of the elevator shaft in the building. Further it comprises physical properties like elevator load, counterweight, weight, damping parameters and so on. Thus, by using the virtual model it is possible to calculate the rope sway based on the acceleration sensor data and the predicted car position.

In a preferred embodiment a virtual elevator model is used for said calculation already during the engineering phase, i.e. already before the elevator system starts working. In this case, by means of the virtual elevator, rope sway amplification data tables are calculated. These data tables are further memorized in the rope sway control system. By means of the virtual model, it is also possible to solve problematic situations already beforehand in a detailed manner. Thus, right from the start when a building sway situation is determined, it may be possible to lock one or more portions of hoistway from elevator travel and/or to set reduced speed operation for elevator car(s) in one or more portions of hoistway. As a consequence, it may be also possible to forecast passenger transport capacity in a rope sway situation.

In a preferred embodiment of the invention for the estimation of the rope sway the prediction of the elevator car position half the building sway period ahead is used to get an early estimation of the corresponding rope sway situation. This enables the taking of countermeasures to the excessive rope sway beforehand.

In a preferred embodiment the prediction of the elevator car position more than half the building sway period ahead is used for the estimation of the rope sway to get a very early estimation of the corresponding rope sway situation. In this situation the very early estimation of the rope sway is preferably verified with at least one consecutive estimation of the rope sway performed after the run of the elevator car. This very early rope sway may not be accurate as one which is performed for example half the building sway beforehand but it still gives more time to predict an excessive rope sway situation and take countermeasures against it. In this case, it is advantageous if the very early estimate of the rope sway is verified with the car position prediction value calculated half the building sway period ahead of the current situation.

If excessive rope sway is determined, there are several possibilities to proceed. It is possible to modify the elevator car motion profile such that the car will avoid non-desired locations in the shaft or pass them as soon as possible. This way elevator ride comfort may be improved. It is also possible to decelerate and stop the car at the closest possible landing to release the elevator passengers. Alternately if the determination of excessive rope sway was based on an early estimate, it may even possible to cancel elevator trips with potentially compromised ride comfort. Alternately or additionally, it may be possible to perform active measures against the rope sway such as operating one or more suitable actuators such as a retractable rope sway limitation device to prevent the consequences of the excessive rope sway or to act against the excessive rope sway.

According to a preferred embodiment, if excessive rope sway is determined, elevator car speed is decreased. This can mean that elevator trip is still continued to the original destination, but with reduced speed. By this measure it may be possible to reduce car vibration caused by rope sway. Thus elevator ride comfort may be improved in rope sway situation.

According to an embodiment, the elevator controller is configured to operate an actuator depending on the comparison result of the estimated rope sway with the threshold value. This actuator can actively reduce rope sway by interacting with the ropes, e.g. pushing a roller against the rope via a cylinder/piston actuator to eliminate rope sway at the place of the actuator. The use of the actuator and the effect of the actuator can also be taken into account when simulating the elevator rope sway.

According to an embodiment, the actuator is a retractable rope sway limitation device, particularly at least one retractable damper arm. This kind of actuator is preferably used in very high buildings, e.g. in at least 500 meter high buildings.

In a preferred embodiment of the invention, the actual rope displacement is detected and the rope amplitude from the rope sway estimation is amended to match the current situation. By this measure, the virtual or estimated predictions can be brought to coincide with the actual situation which allows the prediction to be amended according to reality. This is a good means to monitor the quality of the prediction and to bring the prediction into better coincidence with the real situation.

The invention also refers to an elevator which is able to perform the above-mentioned method. This elevator comprises an elevator controller which is configured to predict a movement profile of the elevator car, a building acceleration sensor as well as a rope sway estimation unit to calculate an estimated rope sway based on the predicted elevator position data obtained from the predicted movement profile and the signal from the building acceleration sensor. Such an elevator is able to predict excessive rope sway already before the elevator car reaches the position in which the excessive rope sway happens. Thus, the building sway or acceleration is measured with a sensor and additionally the motion profile of the elevator is determined with the elevator controller for the elevator car from the departure floor to its arrival floor. A time-dependent elevator car position prediction is then retrieved from the motion profile established by the elevator controller. It is of course possible that the motion profile is not established by the elevator controller itself but by a separate module or cloud server or the like connected to it.

Preferably, the rope sway is determined by means of a simulator or virtual elevator based on the measured building acceleration, for example the building shake, and the elevator car position prediction from the motion profile. Simulation can take place already during manufacturing phase, and simulation results may be memorized in a table, which is then used for real-time rope sway monitoring (i.e. already in engineering phase, see above). In an alternative embodiment, real-time simulation may be used for rope sway monitoring. If an excessive rope sway is determined, the elevator is then able to take safety measures. The inventive elevator allows the earlier determination of non-desired rope sway amplitudes. The elevator operation can then be limited when the predictive rope sway amplitudes exceed a given threshold. Of course, the virtual elevator model does not only comprise the physical properties of the elevator and building parameters but also damping models of the whole elevator system, particularly of the roping. Therefore, the virtual elevator model comprises a damping model which discloses in detail the damping coefficients of the ropes. This model is thus adapted to consider the predicted time-dependent elevator car position which improves the rope sway estimation accuracy.

According to a preferred embodiment, the elevator may comprise one or more sensors, such as a rope displacement sensor and/or a car position sensor. Said one or more sensors may be connected with the elevator controller. The virtual elevator may be operated in a remote server, which may be communicatively connected to elevator controller and/or rope sway estimation unit. The simulation model (e.g. parameters of the simulation model) of the virtual elevator may be updated/corrected by means of measurement data from said one or more sensors.

A simulator or virtual model may be implemented remote from the elevator controller, even connected via a network for example as a remote cloud computer or server which communicates with the elevator controller. Thus, the present invention provides further improvement for the elevator service and elevator safety in rope sway situations. By means of the invention it is possible to advance the decision process of the rope sway monitoring so that the elevator service interruptions can be minimized and alternative courses of action may be taken instead, if necessary. Accordingly, with the inventive method or elevator, the elevator service and availability are improved without compromising the elevator safety.

Generally, the building sway period or natural period of building is a function of the building height. Typically the building sway period can be somewhere between 2 to 8 seconds for building height from 100 to 350 meters.

Following terms are used as synonyms: excessive rope sway-rope sway amplitudes exceeding a threshold value-non-desired rope sway amplitude; simulator-virtual elevator-elevator model-simulation computer-virtual model;

It is apparent for the skilled person that the above-mentioned embodiments may be combined with each other arbitrarily.

BRIEF DESCRIPTION OF THE DRAWINGS

Hereinafter, the invention is described by the aid of the enclosed drawings in which.

DETAILED DESCRIPTION

Figure 1:
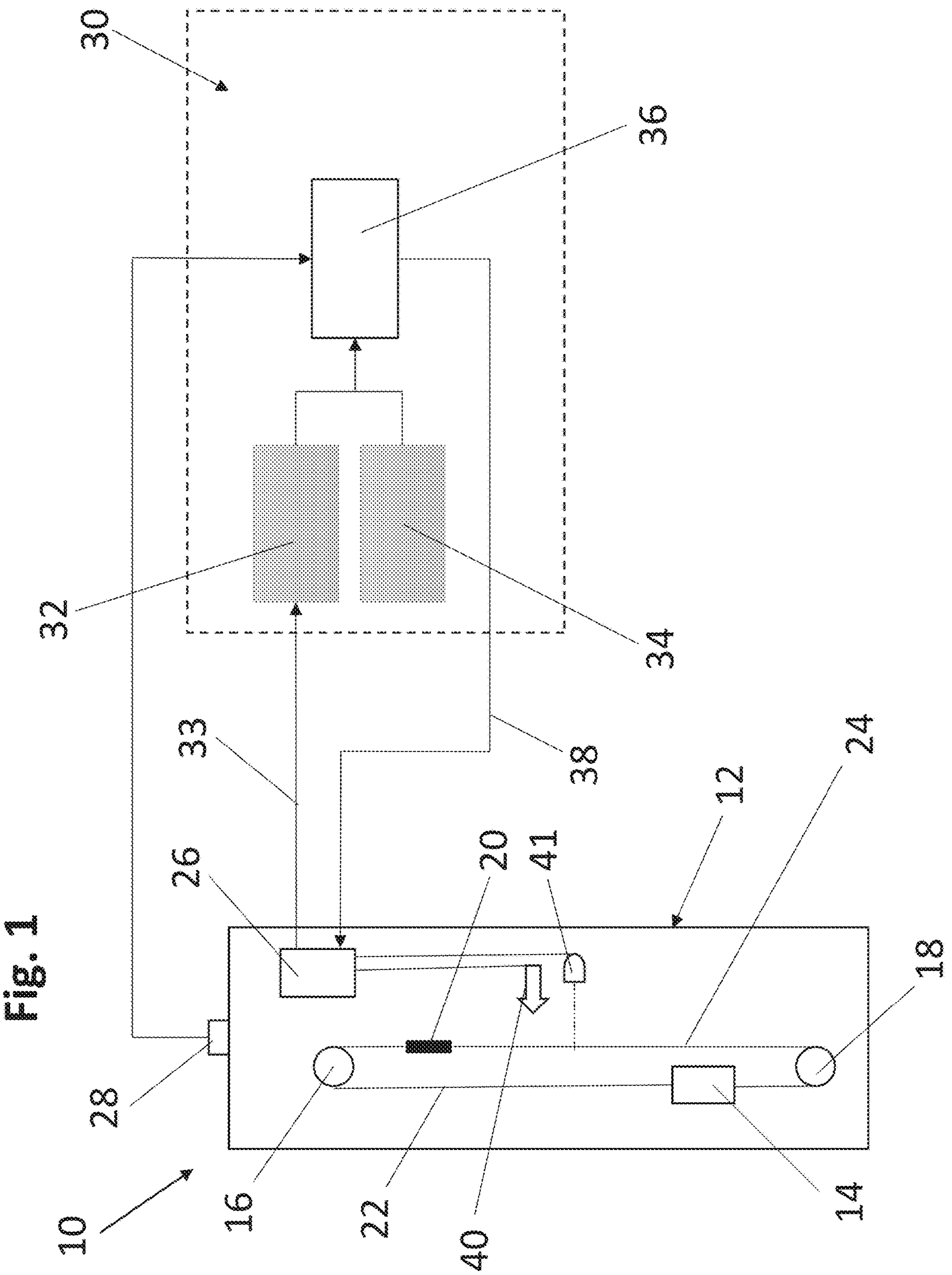
FIG. 1 shows a flow-chart of the inventive elevator.

FIG. 1 shows an elevator 10 comprised in a building 11 having an elevator shaft 12. The building 11 is particularly a high rise building as for example a skyscraper and correspondingly, the elevator shaft 12 is a very long shaft of a high rise elevator. In the elevator shaft 12, an elevator car 14 and a counterweight 20 with their top are connected via upper suspension ropes 22 running over an upper traction sheave 16. Further the elevator car 14 and the counterweight 20 are with their bottom connected via lower compensation ropes 24 running over a lower compensation sheave 18. The car 14 and counterweight 20 are moved via the suspension ropes which are in friction co-action with the traction sheave which is connected to the output shaft of an elevator motor.

The elevator 10 has an elevator controller 26 controlling elevator motor 16 and thus the movement of the elevator car 14. Further the elevator 10 comprises call input means, e.g. destination call panels in the lobby and on the floors for the input of a destination floor or driving direction. The elevator controller also comprises a car allocation model, which allocates a given call to an elevator under consideration of pre-determined optimisation criteria as e.g. passenger waiting time, passenger driving time, total ride time, energy consumption etc., Connected with the building 11 is a building acceleration sensor 28 which measures any acceleration acting on the building, e.g. caused by seismic activity or wind pressure. The elevator controller 26 is connected with a rope sway control system 30 which may be part of the elevator controller 26 or may be located apart from it whereby even a location in a cloud server is possible.

The sway control system 30 comprises an elevator position prediction module 32. The elevator position prediction module 32 comprises motion profiles for the elevator car for all possible allocation situations. Thus the module 32 can predict from the current allocation situation and from the current elevator car position and/or movement data the motion profile of the car position over the time on its travel between departure floor and the final destination floor. The allocation based travel data and the current position/movement of the elevator car are obtained from the elevator controller 26 via the input line 34. The position of the elevator car 14 determines the length of all different rope segments in the elevator hoistway.

In first embodiment, precalculated amplification data tables 34 are used for real-time rope sway calculation. These data tables are calculated beforehand by means of simulator and are stored in the sway control system 30 or in a memory of the controller.

In a second alternative embodiment, the rope sway control system 30 further comprises a simulator 35 of the elevator system. The simulator 35 comprises all physical parameters of the elevator of its roping and all the damping parameters correlated to it. The heart of the rope sway control system 30 of both the first and the second embodiment is a real-time rope sway calculation unit 36 which gets the predicted car position data from the elevator position prediction unit 32. In first embodiment, said data tables are used; in second alternative embodiment simulator is used for calculating the complete physical data from the simulator 35.

Via the movement profile established by the elevator position prediction unit 32 and physical data of the elevator from the simulator 35/the data tables, the real-time rope sway calculation unit can-together with the data from the acceleration sensor 28-calculate the rope sway which is going to happen along the whole journey of the elevator car along its path in the elevator shaft 12. The rope sway is then calculated considering the predicted car position on its way, and the current building sway measured by the sensor 28. If the rope sway which will occur along the predicted positions of the elevator car exceeds at least one threshold value, this means that an excessive rope sway will be expected along the travel of the elevator car, normally at a certain position of the elevator car, at which the natural sway frequency of the free length of the suspension ropes 22 and compensation ropes 24 build up with the building sway frequency. In this case a signal is outputted via the output line 38 back to the elevator controller 26 which is either able to modify or cancel the elevator travel itself. In some embodiments the signal may operate a rope sway limitation device 40, for example a roller touching the elevator rope to suppress the rope sway which is retractable after the critical position has been passed by the elevator car.

Optionally, the elevator further comprises at least one rope displacement sensor 41 which may be an optical sensor. This rope displacement sensor 41 allows the verification of the estimated rope sway data with the actual rope sway to verify and adapt the estimated data which leads to a better accuracy of the prediction.

Of course the rope sway control system 30 and/or all components 32, 34, 36 thereof may be part of the elevator controller or being located in separate modules connected with the elevator controller 26 via a data connection.

In summary, the inventive method and the inventive elevator as shown in FIG. 1 is able to predict non-desired rope sway conditions in good time before they really happen, in good time before the elevator really assumes the problematic position. Thus, the elevator controller 26 is able to take countermeasures in good time beforehand to avoid these situations or to act against them.

Figure 2:
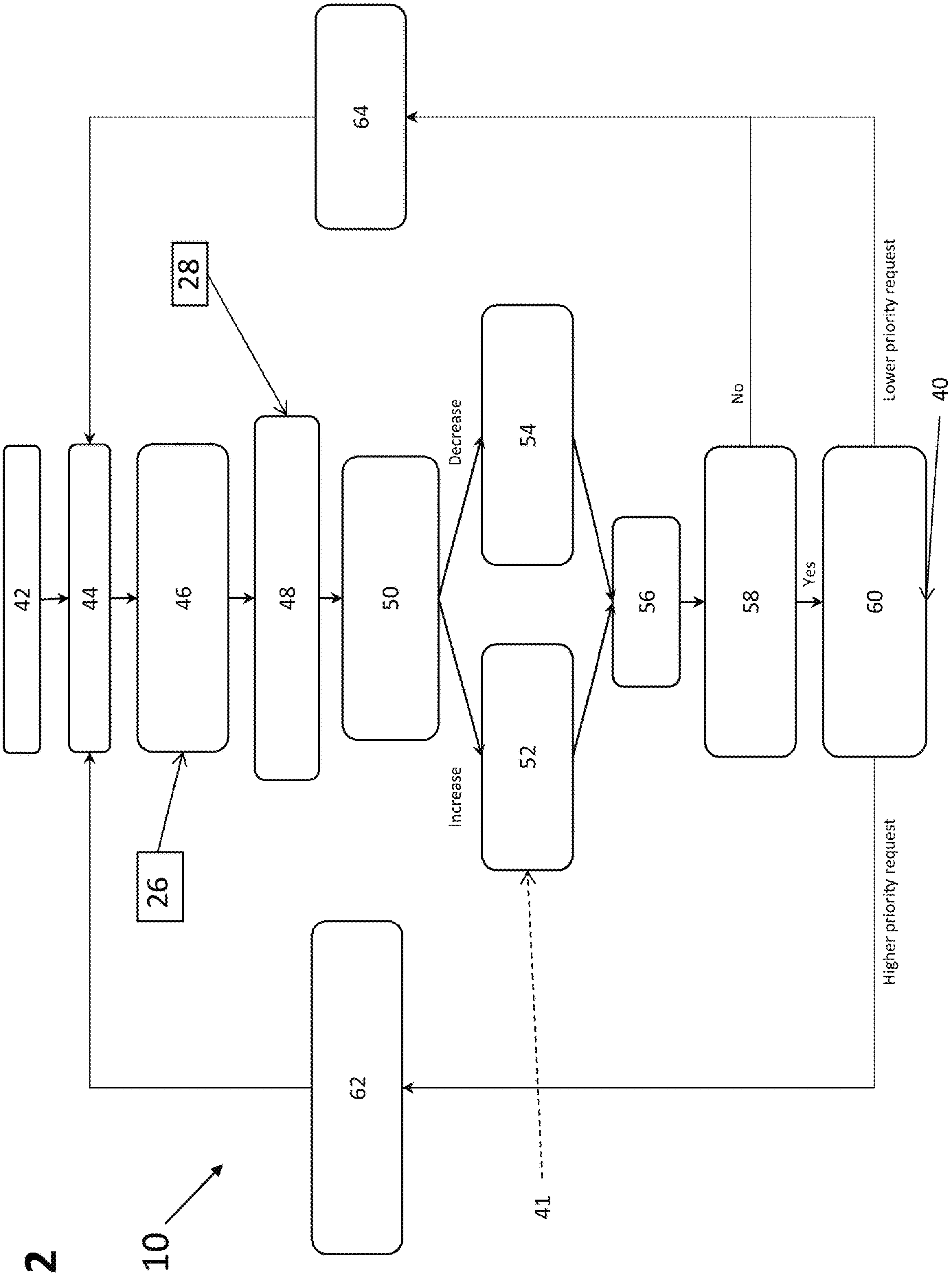
FIG. 2 shows a method flow diagram of the inventive method.

FIG. 2 shows a method flow-chart of the rope sway monitoring of an elevator during a car travel. With the input of an elevator call and the subsequent allocation of an elevator, the elevator journey is via the elevator position prediction module known to the rope sway calculation unit 36 which performs the method of FIG. 2. The calculation routine starts at 42 and progresses to step 44 in which a calculation period is updated. In the embodiment of FIG. 2, the calculation period is selected to meet the building sway period, but the calculation period could also be selected differently (calculation period may be for example 1s-15s). The building sway period maybe a constant given by the builder. In step 46 the motion profile from the elevator controller is obtained and the position of the elevator car in the middle of the building sway period is predicted. Further in step 48 the effective building acceleration for the current building sway period is calculated, using the current signal of the building acceleration detector 28, and the data tables 34. In step 50 it is-based on the data tables 34 in the first embodiment or based on the simulator data 34 in the second embodiment-determined whether the current rope amplitude still increases or has already reached a maximum.

If the rope amplitude increases, the process branches to step 52, in which the current rope sway amplitude increase is determined. The rope sway is calculated in step 52 with a first calculation method using an amplification model (e.g. the data tables). Otherwise the decrease of the rope sway is calculated in step 54 with a second calculation method using a damping model. The use of the damping model is explained as follows.

Decrement of rope sway takes place in a logarithmic manner. In real-time rope amplitude calculation, the calculation time step is equal to building sway period $T_{building}$ (a constant, usually given by the builder). The elevator rope segment period $T_{rope}$ however is a function of car position $z_{car}$ in the shaft. The following relation is defined, that gives the number of rope vibration cycles n within one building vibration cycle.

$$n(z_{car}) = \frac{T_{building}}{T_{rope}(z_{car})} \tag{1}$$

In other words, $n(Z_{car})$ is a function of the elevator car position. The rope segment period $T_{rope}$ values are calculated a-priori for different car locations and different rope segments, using the simulator. The values are stored in an array or memory of the rope sway system 30 that is used during real-time amplitude calculation. The rope segment period $T_{rope}$ used in the calculation corresponds to the first natural mode of the rope segment.

So the value of the elevator rope segment vibration amplitude x (i.e., the value of the exponential decay envelope) after one building cycle is calculated as $$x(t_0+T_{building})=x(t_0)\cdot e^{-2\pi n\xi} \quad (2)$$

In (2), ξ is a damping factor, which may be a predefined constant, which may be selected when data tables 34 are calculated. Alternatively, the damping factor 7 may be defined as a function of elevator car position and concurrent rope sway amplitude.

The use of equations (1) and (2) enables fast and reliable real-time calculation of the rope sway in a damping situation.

Both steps 52 as well as 54 branch back to step 56 wherein the rope sway value corresponding to the middle of the current period is updated based on steps 52 or 54. Afterwards the method proceeds to decision step 58, wherein it is checked whether the updated rope sway values necessitates protective measures. If no, the process branches to step 64 in which it is waited until the end of the building sway period and then branches back to step 44. If yes, in step 60 any current active sway protection method is verified, e.g. by reading the operating status of the rope sway limitation device 40 from the elevator controller 26. Afterwards a differentiation is made depending on the priority of the situation, i.e. depending on the value of any sudden increase of building sway, e.g. after an earth quake. In case of a high priority protective measures are immediately taken in step 62. These measures include any changes on the car path to avoid the non-desired situation and/or the activation of rope sway limitation devices and/or a stop of the elevator operation after releasing the passengers e.g. at the nearest landing. The process then waits till the end of the building sway period and branches back to step 44.

If the priority is lower it is branched from step 60 to step 64 where it is waited until the end of the building sway periods and then it branches back to step 44.

This process ensures a reasonable adapted response to any non-desired sway conditions in advance, which allows suitable measures, as e.g. the release of passengers already at an early stage before the non-desired situation is going to take place.

Figure 3:
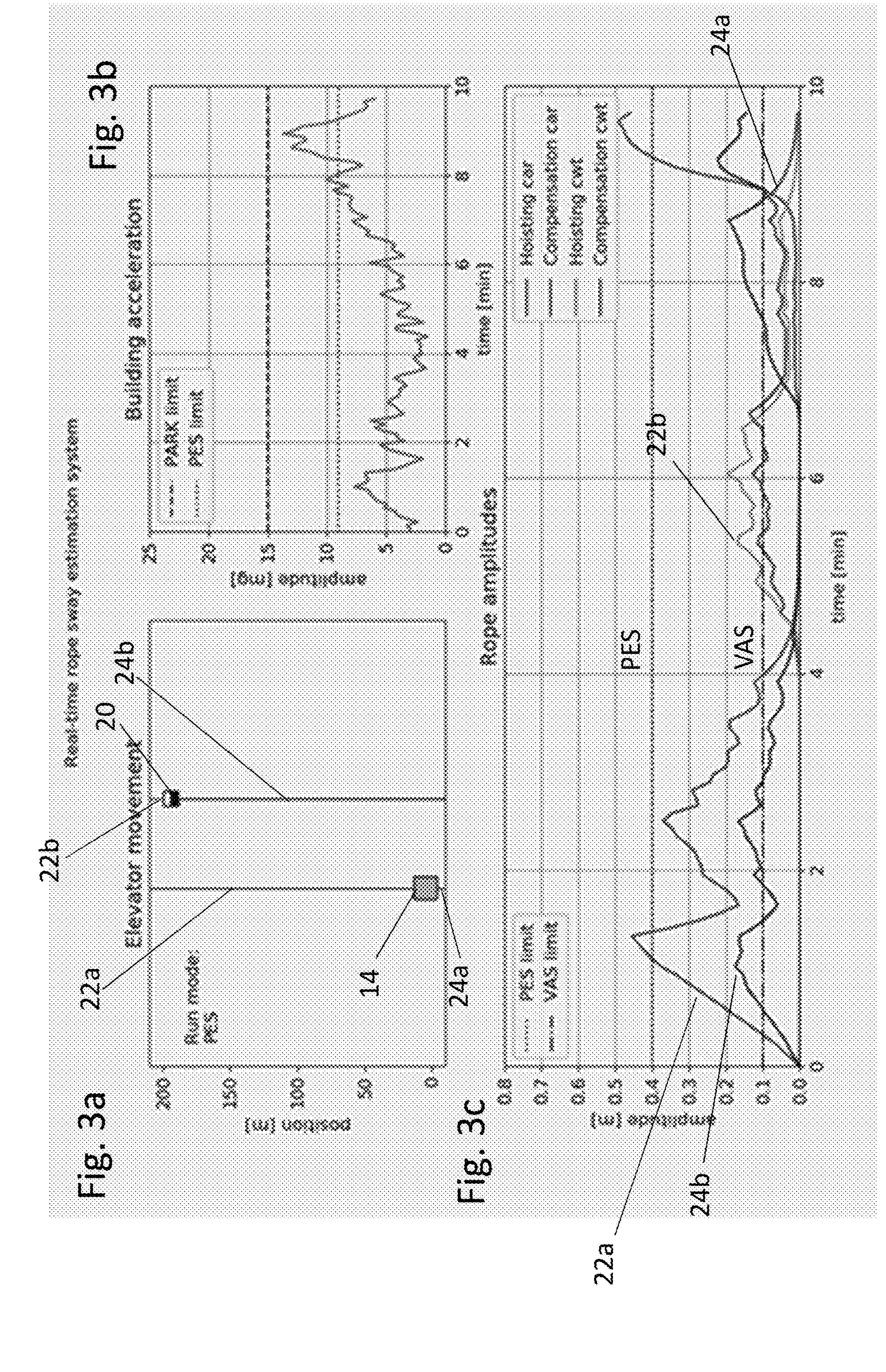
FIG. 3 shows examples of building acceleration and rope sway amplitudes.

FIG. 3 shows schematically the function of the rope sway control system 30 of FIG. 1 by means of an example.

In FIG. 3 FIG. 3*a* shows a very schematic illustration of a predicted car position in an elevator shaft with a length of 200 m. 22*a* is the suspension rope between car 14 and traction sheave 16, while 22*b* designates the suspension rope part between the traction sheave 16 and the counter weight 20. Accordingly, 24*a* designates the compensation rope part between the car 14 and the compensation sheave 18, while 24*b* designates the compensation rope part between the compensation sheave 18 and the counter weight 20. The predicted situation is sensible for excessive rope sway as the car suspension rope 22*a* as well as the counterweight compensation rope 24*b* extend feely nearly along the whole shaft length.

FIG. 3*b* shows a current signal of a building acceleration sensor 28 for the building in which the elevator 10 is installed.

FIG. 3*c* shows the amplitudes of rope sway for the different suspension and compensation rope parts 22*a,b* and 24*a,b* calculated by the rope sway control system 30 for the predicted car and counterweight positions according to FIG. 3*a*. The system comprises several limits for the rope sway amplitudes which lead to certain measures, if exceeded.

The lowest amplitude limit is the VAS limit. VAS means "Variable speed selection" which means that the exceeding of this limit leads to running the elevator slower than normal when elevator approaches a terminal landing.

The next higher limit is the PES limit, where by PES stands for "Performance selection". The passing of this limit by the estimated rope sway leads to the running of the elevator with reduced speed, i.e. half speed not only when approaching a terminal landing.

The highest limit which is only shown in FIG. 3*b* is the PARK limit. Exceeding this limit leads to an immediate parking of the elevator car at a safe (non-resonant) floor during extreme sway conditions.

Thus, the elevator is well adapted to handle in advance any situations with respect to the building which may lead to non-desired rope sway conditions, as e.g. earth quakes, strong wind, objects hitting the building etc.

The invention is not delimited to the enclosed embodiments but it can be varied within the scope of the following patent claims.

LIST OF REFERENCE NUMBERS

- 10 elevator
- 11 building
- 12 elevator shaft
- 14 elevator car
- 16 traction sheave
- 18 compensation sheave
- 20 counter weight
- 22 suspension ropes
- 24 compensation ropes
- 26 elevator controller
- 28 building acceleration (sway) sensor
- 30 rope sway control system
- 32 elevator position prediction module
- 34 input line from the elevator controller to the rope sway control system
- 35 virtual elevator model-simulator
- 36 rope sway calculation unit
- 38 output line from the rope sway control system to the elevator controller
- 40 rope sway limitation device
- 41 (real-time) rope displacement sensor
- 42-64 process steps of the rope sway calculation routine

The invention claimed is:

1. A method for operating an elevator installed in connection with a building, the method comprising:

obtaining building acceleration data using a building acceleration sensor of the building;

determining a movement profile for an elevator car in the elevator using an elevator controller, the elevator configured to cause movement of the elevator car in the elevator according to the movement profile;

calculating a predicted elevator car position of the elevator car in the elevator based on the movement profile;

calculating an estimated rope sway of a hoist rope in the elevator based on the predicted elevator car position and the building acceleration data, the hoist rope coupled to the elevator car and running at least partially around a sheave of the elevator, the sheave is a traction sheave or a compensation sheave;

comparing the estimated rope sway with a threshold value to determine a predicted excessive rope sway at the predicted elevator car position; and controlling an operation of the elevator in order to counteract the predicted excessive rope sway.

2. The method according to claim 1, wherein the calculating the estimated rope sway based on the building acceleration data and the predicted elevator car position is performed based on using a virtual model of the elevator.

3. The method according to claim 1, wherein the predicted elevator car position is a predicted position of the elevator car in the elevator at a point in time that is one-half of a building sway period of the building ahead of a current position of the elevator car in the elevator according to the movement profile, the building sway period determined based on the building acceleration data.

4. The method according to claim 1, wherein the predicted elevator car position is a predicted position of the elevator car in the elevator at a point in time that is more than one-half of a building sway period of the building ahead of a current position of the elevator car in the elevator according to the movement profile, the building sway period determined based on the building acceleration data.

5. The method according to claim 4, further comprising comparing the estimated rope sway with at least one consecutive estimation of rope sway of the hoist rope performed subsequent to the calculating of the estimated rope sway to verify the estimated rope sway.

6. The method according to claim 1, wherein, the controlling the operation of the elevator in order to counteract the predicted excessive rope sway includes modifying the movement profile for the elevator car.

7. The method according to claim 1, wherein the controlling the operation of the elevator in order to counteract the predicted excessive rope sway includes decreasing an elevator car speed of the elevator car in the elevator.

8. The method according to claim 1, wherein the controlling the operation of the elevator in order to counteract the predicted excessive rope sway includes decelerating and stopping the elevator car at a nearest landing relative to a current elevator car position of the elevator car in the elevator.

9. The method according to claim 6, wherein the controlling the operation of the elevator in order to counteract the predicted excessive rope sway includes cancelling an elevator trip by the elevator car in the elevator.

10. The method according to claim 1, wherein the controlling the operation of the elevator in order to counteract the predicted excessive rope sway includes operating an actuator to prevent at least one of the predicted excessive rope sway or a consequence of the predicted excessive rope sway in the elevator.

11. The method according to claim 10, wherein the actuator includes a retractable rope sway limitation device.

12. The method according to claim 1, further comprising:

measuring an actual rope displacement of the hoist rope in the elevator using a rope displacement sensor; and adjusting a rope amplitude of the estimated rope sway based on the actual rope displacement.

13. An elevator configured to perform the method of claim 1, the elevator comprising:

an elevator car;

a traction sheave;

a hoist rope, the hoist rope coupled with the elevator car and running at least partially around the traction sheave;

an elevator controller, the elevator controller configured to determine a movement profile of the elevator car in the elevator, the elevator controller configured to cause movement of the elevator car in the elevator according to the movement profile based on friction co-action between the traction sheave of the elevator and the hoist rope;

a building acceleration sensor; and a rope sway estimation unit, the rope sway estimation unit configured to calculate an estimated rope sway based on the movement profile and signals obtained from the building acceleration sensor.

14. The elevator according to claim 13, further comprising a rope displacement sensor connected with the elevator controller.

15. The elevator according to claim 13, further comprising means for being communicatively connected to a virtual elevator.

* * * * *